(12) United States Patent
Kim

(10) Patent No.: US 11,678,017 B2
(45) Date of Patent: Jun. 13, 2023

(54) ELECTRONIC DEVICE AND METHOD FOR CONTROLLING THE SAME, AND STORAGE MEDIUM

(71) Applicant: Samsung Electronics Co., Ltd., Suwon-si (KR)

(72) Inventor: Byuksun Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/089,980

(22) Filed: Nov. 5, 2020

(65) Prior Publication Data

US 2021/0136450 A1 May 6, 2021

(30) Foreign Application Priority Data

Nov. 6, 2019 (KR) .................. KR10-2019-0141244

(51) Int. Cl.
*H04N 21/466* (2011.01)
*H04N 21/435* (2011.01)
*H04N 21/436* (2011.01)

(52) U.S. Cl.
CPC ......... *H04N 21/466* (2013.01); *H04N 21/435* (2013.01); *H04N 21/436* (2013.01)

(58) Field of Classification Search
CPC .. H04N 21/466; H04N 21/435; H04N 21/436; H04N 21/43635; H04N 21/42203; H04N 21/42684; H04N 21/43615; H04N 21/4363; H04N 21/4367; G09G 2370/06
See application file for complete search history.

(56) References Cited

U.S. PATENT DOCUMENTS

| | | | | |
|---|---|---|---|---|
| 2008/0244097 A1* | 10/2008 | Candelore | ........ | H04N 21/43615 710/5 |
| 2013/0212609 A1* | 8/2013 | Sinha | .................. | H04N 21/4532 725/19 |
| 2014/0359675 A1* | 12/2014 | Mank | .................. | H04N 21/6402 725/80 |
| 2015/0163528 A1* | 6/2015 | An | ..................... | H04N 21/4385 725/32 |

(Continued)

FOREIGN PATENT DOCUMENTS

KR 10-2017-0138788 A 12/2017
KR 10-2018-0092778 8/2018

OTHER PUBLICATIONS

International Search Report and Written Opinion dated Feb. 22, 2021 in corresponding application PCT/KR2020/015056.

*Primary Examiner* — Michael R Telan
(74) *Attorney, Agent, or Firm* — Staas & Halsey LLP

(57) ABSTRACT

Disclosed is an electronic device capable of increasing a recognition rate of an external device. The electronic device includes an interface circuitry configured to be connected to an external device; and a processor configured to: identify a characteristic of the connected external device; obtain identification information of the connected external device based on the identified characteristic of the connected external device and a recognition model learning a relation between characteristics of a plurality of external devices and identification information of the plurality of external devices; and perform an operation based on the identification information of the connected external device.

19 Claims, 18 Drawing Sheets

(56) References Cited

U.S. PATENT DOCUMENTS

| | | | |
|---|---|---|---|
| 2015/0213330 A1* | 7/2015 | Chulinin | G06K 9/4647 |
| | | | 382/185 |
| 2016/0142647 A1* | 5/2016 | Gopinath | G06K 9/00744 |
| | | | 348/706 |
| 2017/0041554 A1 | 2/2017 | Gopinath et al. | |
| 2017/0111484 A1* | 4/2017 | Song | H04N 21/443 |
| 2017/0118510 A1* | 4/2017 | Stathacopoulos | G06K 9/6215 |
| 2017/0201793 A1 | 7/2017 | Pereira et al. | |
| 2018/0270525 A1 | 9/2018 | Yu et al. | |
| 2019/0230406 A1* | 7/2019 | Aggarwal | H04N 5/63 |
| 2020/0053180 A1* | 2/2020 | Einaudi | H04L 67/141 |

* cited by examiner

FIG. 9

|    | CEC Name | Code Set | EXTERNAL DEVICE BRAND | Infoframe | Count |
|----|----------|----------|----------------------|-----------|-------|
| #1 | —        | C1234    | BRAND A              | EXTERNAL DEVICE MODEL a  | 374 |
| #2 | —        | C1234    | BRAND F              | EXTERNAL DEVICE MODEL a1 | 138 |
| #3 | —        | S4567    | BRAND G              | EXTERNAL DEVICE MODEL a  | 74  |
| #4 | —        | C1234    | BRAND D              | EXTERNAL DEVICE MODEL a2 | 63  |
| #5 | —        | S4567    | BRAND E              | EXTERNAL DEVICE MODEL a  | 61  |

FIG. 10

|     | CEC Name | Code Set | EXTERNAL DEVICE BRAND | Infoframe | Count |
| --- | --- | --- | --- | --- | --- |
| #6 | EXTERNAL DEVICE MODEL b | C1234 | BRAND A | EXTERNAL DEVICE MODEL c | 1 |
| #7 | EXTERNAL DEVICE MODEL b | S4567 | BRAND H | EXTERNAL DEVICE MODEL c1 | 1 |

FIG. 11

|  | CEC Name | Code Set | EXTERNAL DEVICE BRAND | Infoframe | Count |
|---|---|---|---|---|---|
| #8 | EXTERNAL DEVICE MODEL b | S4567 | BRAND C | EXTERNAL DEVICE MODEL c | 399 |
| #9 | EXTERNAL DEVICE MODEL b | C1234 | BRAND J | EXTERNAL DEVICE MODEL c | 374 |

FIG. 12

| | IR CODE 1 | IR CODE 2 | IR CODE 3 | IR CODE 4 | IR CODE 5 | IR CODE 6 | IR CODE 7 | IR CODE 8 |
|---|---|---|---|---|---|---|---|---|
| BRAND D | 76 | - | - | - | - | - | - | - |
| BRAND E | - | - | - | - | - | 42 | - | - |
| BRAND F | - | - | 100 | - | - | - | - | - |
| BRAND G | - | - | 29 | - | - | - | - | - |
| BRAND H | - | - | - | - | - | - | - | 194 |
| BRAND I | - | - | - | - | - | - | - | 74 |
| BRAND J | - | - | - | - | - | - | 31 | - |
| BRAND K | - | 85 | - | - | - | - | 40 | - |
| BRAND L | - | - | 30 | - | - | - | - | - |
| BRAND M | - | - | 23 | - | - | - | - | - |
| BRAND N | - | - | - | - | 101 | - | - | - |

FIG. 18

| MAIN COMPONENT VARIABLE/RESULT | EXTERNAL DEVICE BRAND | CODESET |
|---|---|---|
| Logo DB | 0 | 0-CODESET GROUP |
| Codeset CONTINUOUS COMMUNICATION | 0-BRAND GROUP | 0-CODESET 1 |
| infoframe | 0-BRAND GROUP | 0-CODESET GROUP OR CODESET 1 |
| cec | 0 | 0-CODESET GROUP |
| OTHER INFORMATION: RESOLUTION | 0 | 0-CODESET GROUP |

ELECTRONIC DEVICE AND METHOD FOR CONTROLLING THE SAME, AND STORAGE MEDIUM

CROSS-REFERENCE TO RELATED APPLICATION

This application is based on and claims priority under 35 U. S. C. § 119 to Korean Patent Application No. 10-2019-0141244, filed on Nov. 6, 2019, the disclosure of which is herein incorporated by reference in its entirety.

BACKGROUND

1. Field

The disclosure relates to an electronic device capable of automatically recognizing an external device when the electronic device is connected to the external device, a method for controlling the same, and a storage medium.

2. Discussion of Related Art

Televisions receive images through an image supply device provided by a content provider, for example, a set-top box. At this time, the television recognizes all image supply devices in such a manner that a smart remote control or IR blasting is used to analyze received images while transmitting designated IR signals (Home, Guide, Channel, and the like) of the image supply devices in the country and find a logo of a specific content provider.

Televisions may not automatically recognize content supply devices for various reasons, such as a change in a logo of a specific content provider in the received images, a similar logo used by another provider, insufficient input image data, or an update to the latest software. As described above, when the automatic recognition cannot be made, technicians have performed maintenance by collecting image data through a visit business trip, creating a model for the changed logo, and then updating the created model. At this time, technicians perform an operation of manually finding and displaying logo areas of image data collected by country, and dividing the logo areas of the displayed image into thousands of sheets using a repetitive sliding window technique and learning the logo areas, and then repeating the above operations to increase the recognition accuracy of the logo.

As a result, the manual recognition by the technician has a problem in that the technician's travel expenses for collecting image data are incurred. In addition, the televisions continuously fail in the automatic recognition during the collection, learning, and update response for the maintenance of technicians, causing inconvenience to the user.

SUMMARY

In order to accomplish the above object, an electronic device according to the disclosure is provided. The electronic device includes an interface circuitry configured to be connected to an external device, and a processor configured to: identify a characteristic of the connected external device; obtain identification information of the connected external device based on the identified characteristic of the connected external device and a recognition model learning a relation between characteristics of a plurality of external devices and identification information of the plurality of external devices; and perform an operation based on the identification information of the connected external device.

The recognition model may be learned to map a plurality of pieces of device information on the external device to an electronic device brand and/or an external device control code.

The processor may be configured to recognize the connected external device based on an image received from the external device.

The processor may be configured to recognize the connected external device based on at least one of a logo or a UI included in the received image.

The processor may be configured to perform: recognizing the connected external device based on device information on the external device, recognizing the connected external device based on the received image, and finally determining the external device in consideration of the recognition results.

The processor may be configured to select the external device based on area information using an IP address to which the electronic device is connected.

The device information or the pre-stored device information may include at least one of HDMI Infoframe information, HDMI CEC information, IR code information, sound information, or resolution information.

The device information may be assigned a recognition weight according to the external device brand.

The device information may have a cluster pattern according to the external device brand.

A method for controlling an electronic device according to an embodiment of the disclosure is provided. The method for controlling an electronic device includes: connecting with an external device; identifying a characteristic of the connected external device; obtaining identification information of the connected external device based on the identified characteristic of the connected external device and a recognition model learning a relation between characteristics of a plurality of external devices and identification information of the plurality of external devices; and performing an operation based on the identification information of the connected external device.

A computer-readable storage medium in which a computer program executed by a computer according to an embodiment of the disclosure is stored is provided. The computer program is configured to perform an operation of connecting with an external device, identifying a characteristic of the connected external device, obtaining identification information of the connected external device based on the identified characteristic of the connected external device and a recognition model learning a relation between characteristics of a plurality of external devices and identification information of the plurality of external devices, and performing an operation based on the identification information of the connected external device.

BRIEF DESCRIPTION OF THE DRAWINGS

The above and other aspects, features, and advantages of certain embodiments of the disclosure will be more apparent from the following description taken in conjunction with the accompanying drawings.

FIG. 9 is a table illustrating an example of raw recognition data of device information.

FIG. 10 is a table illustrating another example of the row recognition data of the device information.

FIG. 11 is a table illustrating another example of the row recognition data of the device information.

FIG. 12 is a mapping table that associates between collected data.

FIG. 18 is a diagram illustrating an example of a mapping table in which the brand and codeset of the external device are connected to a main component variable.

DETAILED DESCRIPTION

Figure 1:
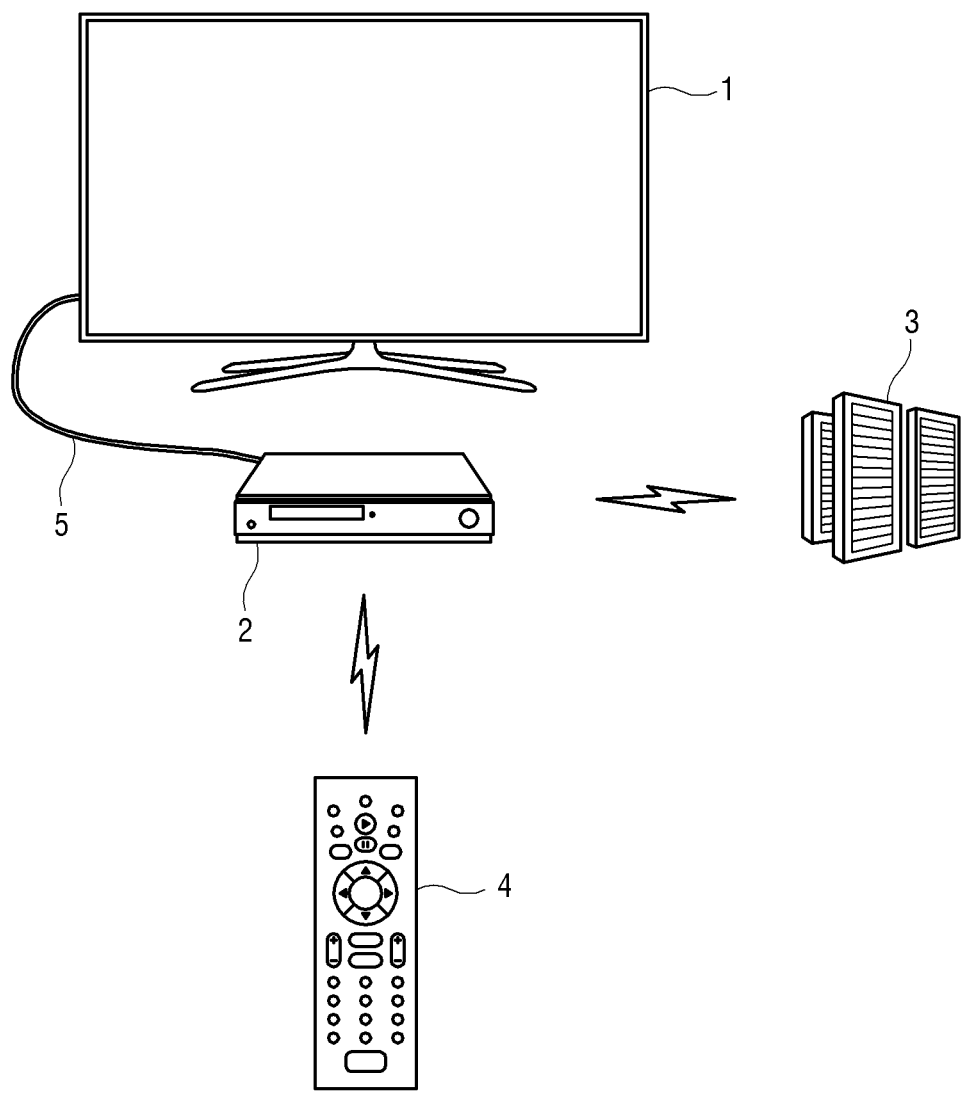
FIG. 1 is a diagram illustrating an electronic device according to an embodiment of the disclosure.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In the disclosure, an expression "have", "may have", "include", "may include", or the like, indicates existence of a corresponding feature (for example, a numerical value, a function, an operation, a component such as a part, or the like), and does not exclude existence of an additional feature.

In the disclosure, an expression "A or B", "at least one of A and/or B", "one or more of A and/or B", or the like, may include all possible combinations of items enumerated together. For example, "A or B", "at least one of A and B", or "at least one of A or B" may indicate all of (1) a case in which at least one A is included, (2) a case in which at least one B is included, or (3) a case in which both of at least one A and at least one B are included.

In embodiments of the disclosure, terms including ordinal numbers such as first and second are used only for the purpose of distinguishing one component from other components, and singular expressions include plural expressions unless the context clearly indicates otherwise.

In addition, in the embodiment of the disclosure, terms such as 'top', 'bottom', 'left', 'right', 'inside', 'outside', 'inner surface', 'outer surface', 'front', and 'rear' are defined based on the drawings, and shapes or positions of each component are not limited thereby.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, in some cases, an expression "a device configured to" may mean that the apparatus may "do" together with other apparatuses or components. For example, a "sub-processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

The disclosure is to provide an electronic device capable of improving a recognition rate of a connected external device, a method for controlling the same, and a storage medium in which a computer program is stored.

An electronic device 1 according to various embodiments of the disclosure may include an electronic device receiving various types of content, for example, at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, and a wearable device. In some embodiments, the electronic device 1 may include at least one of, for example, a television, a Blu-ray player, a digital video disk (DVD) player, an audio player, a refrigerator, an air conditioner, a cleaner, an oven, a microwave oven, a washing machine, an air cleaner, a set-top box, a home automation control panel, a security control panel, a media box, a game console, an electronic dictionary, an electronic key, a camcorder, and a digital photo frame.

In other embodiments, the electronic device 1 may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, and Internet of things (IoT) devices (for example, a light bulb, various sensors, a sprinkler system, a fire alarm, a thermostat, a street light, a toaster, an exercise equipment, a hot water tank, a heater, a boiler, and the like).

In the disclosure, the term "user" may refer to a person using the electronic device 1 or a device (for example, an artificial intelligence electronic device) using the electronic device 1.

FIG. 1 is a diagram illustrating the electronic device 1 according to the embodiment of the disclosure. The electronic device 1 may be implemented as television (TV) that may receive video content from a specific content provider through an external device 2 such as a set-top box, and may be controlled by a remote control signal received from a remote control 4. The electronic device 1 does not include a display that displays an image, but may output an image to an external output device, such as a monitor or TV, through an image interface such as HDMI, DP, and Thunderbolt.

Obviously, the electronic device 1 is not limited to the television, but may be implemented as various electronic devices using various types of content that content providers provide. In addition, the external device 2 is not limited only to a set-top box that supplies video content, but may be implemented as a dedicated device of a content provider that supplies various types of content.

Referring to FIG. 1, the electronic device 1 is connected to the external device 2, such as a set-top box, by an HDMI cable or an optical cable 5. When the electronic device 1 is connected to the external device 2 through the HDMI cable or the optical cable 5, the electronic device 1 may receive device information, which represents a first characteristic of the external device 2, such as, for example, HDMI Infoframe information, HDMI CEC information, sound information, resolution information, IR code information of a remote control of the external device, and the like. The HDMI Infoframe information and the HDMI CEC information may include a device model name of the external device 2. A manufacturer of the external device 2 may be sold or rented to a single or multiple content providers. Obviously, the manufacturer of the external device 2 and the content provider may be the same. Hereinafter, the device information included in the HDMI Infoframe information and the HDMI CEC information is referred to as an "external device model", and the "external device model" used by a specific content provider is referred to as the "external device brand". The sound information and the resolution information may include supportable voice channels and resolution performance characteristics of the external device 2. The IR code information of the remote control of the external device may include IR codeset information for controlling the external device 2.

The electronic device 1 may use the device information such as the HDMI Infoframe information, the HDMI CEC information, the resolution information, the IR code information of the remote control of the external device, and a device information-based recognition model to figure out a brand of the external device 2 and/or a control code (IR code) of the external device 2.

The device information-based recognition model may collect and analyze recognition information corresponding to the first characteristic of the external device 2, which is manually or automatically recognized previously very many times, such as the HDMI Infoframe information, the HDMI CEC information, the resolution information for each external device brand, and IR code information of the remote control, and may mean data or a database (DB) learning a relation between first characteristics of a plurality of external devices and identification information of the plurality of external devices and mapping between the device information related to identification of the external device 2 and the brand of the external device.

In addition, the electronic device 1 may receive image data including video content and/or EPG UI before the external device 2 is recognized. In this case, the video content and/or the EPG UI is identification information of the external device, which represents a second characteristic of the external device to be capable of identifying the external device.

The electronic device 1 may recognize the brand of the external device 2 by extracting and verifying the identification information from an identifier area having the identification information of the external device 2 in the received image data, for example, in the EPG UI based on the image-based recognition model. The image-based recognition model capable of recognizing the external device 2 may mean data or database (DB) including at least one identification information for identification of the external device included in the image data, such as a logo and/or guide, a UI image and/or text in the form of a home menu, and a location and/or size of an identifier area, and learning a relation between second characteristics of the plurality of external devices and the identification information of the plurality of external devices.

The external device 2 may transmit the video content and/or the EPG UI provided by the content provider to the electronic device 1 upon request. The external device 2 may include the external device 2 provided by each content provider, such as a set-top box, a Blu-ray disc player, a broadcasting device that transmits broadcast signals, a cable broadcasting device that supplies content through a cable, and a media server that supplies media through the Internet.

The server 3 may provide content or create a device information and/or image-based recognition model for recognition of the external device 2 and distribute the created device information and/or image-based recognition model to each electronic device 1. The server 3 may provide services such as recognizing voices provided by electronic device 1. The server 3 may be implemented as one or more servers for each service.

Figure 2:
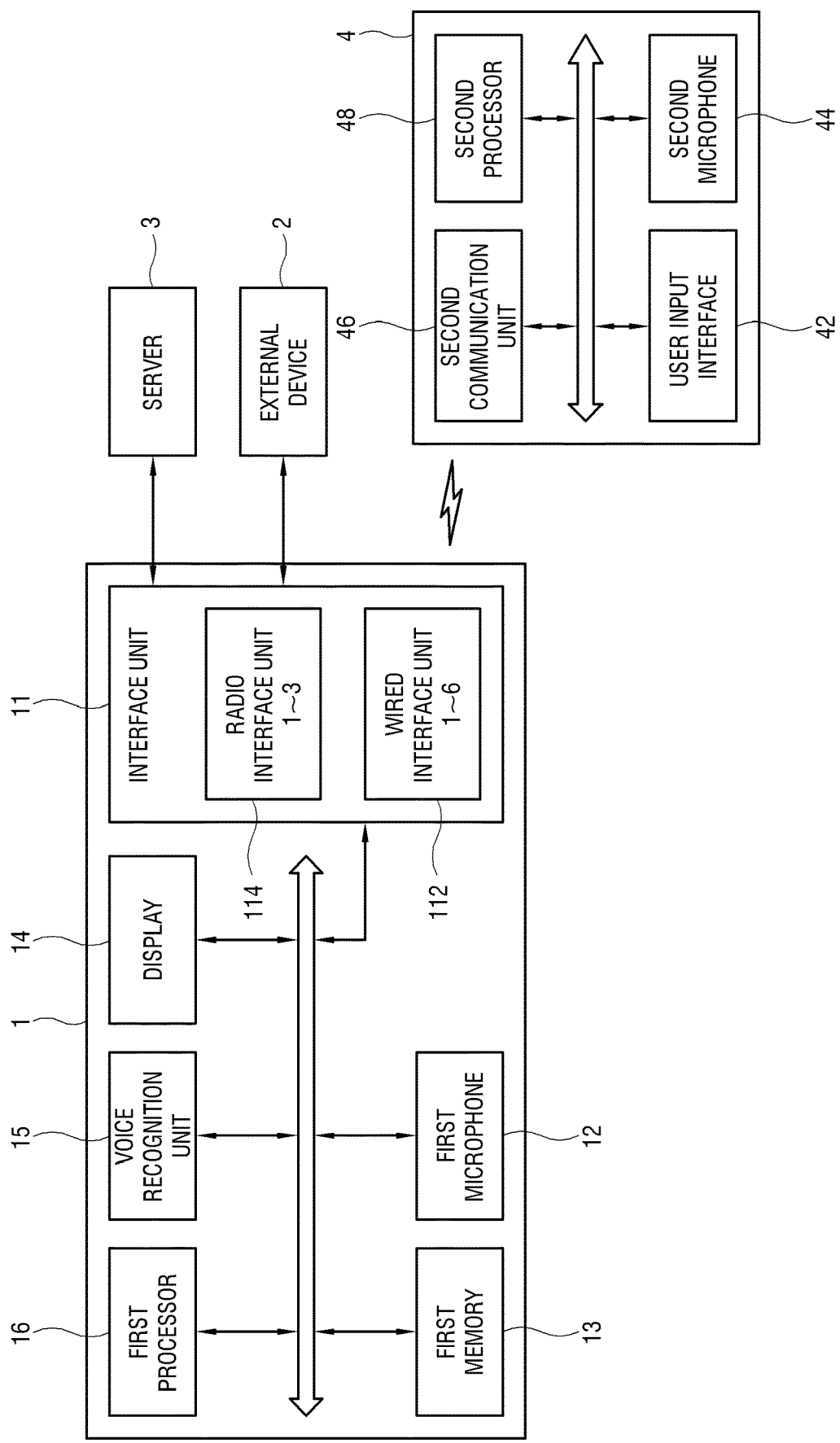
FIG. 2 is a block diagram illustrating a configuration of the electronic device of FIG. 1.

FIG. 2 is a block diagram illustrating a configuration of the electronic device 1 of FIG. 1. The electronic device 1 may include an interface circuitry 11, a first microphone 12, a first memory 13, a display 14, a voice recognition unit 15, and a first processor 16.

The interface circuitry 11 as an interface circuitry may include wired interface circuitries 1 to 6 112 and wireless interface circuitrys 1 to 3 114.

The wired interface circuitry 1 may include a terrestrial/satellite broadcasting antenna connection, a connection interface for a cable broadcasting cable, and the like for receiving a broadcast signal.

The wired interface circuitry 2 may include HDMI, DP, DVI, Component, S-Image, composite (RCA terminal), and the like for connecting an image device.

The wired interface circuitry 3 may include a USB interface or the like for a general-purpose electronic device connection.

The wired interface circuitry 4 may include a connection interface for an optical cable device.

The wired interface circuitry 5 may include a connection interface for audio devices such as a headset, earphones, and external speakers.

The wired interface circuitry 6 may include a connection interface for wired network devices such as Ethernet.

The wireless interface circuitry 1 may include a connection interface for wireless network devices such as Wi-Fi, Bluetooth, ZigBee, Z-wave, RFID, WiGig, WirelessHD, ultra-wide band (UWB), wireless USB, and near field communication (NFC).

The wireless interface circuitry 2 may include an IR transmission/reception module for transmitting and/or receiving a remote control signal.

The wireless interface 3 may include a connection interface for mobile communication devices such as 2G to 5G.

The interface circuitry 11 may include a dedicated communication module for performing communication exclusively for each of the mobile device and the server.

The interface circuitry 11 may include a common communication module and the like for performing communication with both the mobile device and the server. For example, both the mobile device and the server may perform communication through the Wi-Fi module.

The interface circuitry 11 may include an input interface circuitry and an output interface circuitry. In this case, the input interface circuitry and the output interface circuitry may be integrated into one module or may be implemented as separate modules.

The first microphone 12 may receive a user's voice. The user's voice may also be received through a path other than the first microphone 12. For example, the user's voice may be received through the remote control 4 equipped with a microphone, another terminal device of the user such as a smartphone, or the like, but is not limited thereto. The user's voice received by the remote control 4 or another terminal device may include various voice commands for controlling the electronic device 1 as described above. The received user's voice may be recognized as a control command for controlling the electronic device 1 through the voice recognition unit 15.

The first memory 13 is a storage medium readable by a computer and stores data without limitation. The first memory 13 is accessed by the first memory 16, and performs operations such as reading, writing, modifying, deleting, and updating data by the first processor 16.

As the external device 2 is connected, the first memory 13 provides raw device information on the external device such as the Infoframe information, the CEC information, the sound information, and the resolution information received by the HDMI cable, the optical cable, and the like, and the IR code information of the external device 2 received by the IR receiving unit.

The first memory 13 may store an external device recognition result, recognition failure, recognition success, and recognition related data of the electronic device 1.

The data stored in the first memory 13 may include, for example, the device information-based recognition model, the image-based recognition model, and the like capable of recognizing the external device 2.

The device information-based recognition model may be created by learning in order to map the device information related to the identification of the external device 2 and the brand of the external device 2 among the device information on the external device collected by the electronic device 1. Alternatively, the device information-based recognition model may be created by learning in the server 3 and then distributed to the electronic device 1.

The image-based recognition model may be created by learning the identification information of the external device 2, such as the logo image and/or guide, the UI image and/or text in the form of the home menu, and the location and/or size of the identifier area, in the EPG UI included in the image data received from the external device 2. Alternatively, the image-based recognition model may be created by learning in the server 3 and then distributed to the electronic device 1.

The first memory 13 may include a voice recognition module (voice recognition engine) for recognizing the received voice. Obviously, the first memory 13 may include an operating system, various applications executable on the operating system, image data, additional data, and the like.

The first memory 13 includes a nonvolatile memory in which a control program is installed, and a volatile memory in which at least a part of the installed control program is loaded.

The first memory 13 may include at least one storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The display 14 displays an image based on an image signal that is subjected to signal processing. The display 14 may display digital content that is stored in the first memory 13 or received from the external device 2 or the server 3 through the interface circuitry 11.

The implementation scheme of the display 14 is not limited, and the display 14 may be implemented in various display panels such as liquid crystal, plasma, a light-emitting diode, an organic light-emitting diode, a surface-electron gun conduction electron-emitter, carbon nano-tube, and nano-crystal.

The display 14 may additionally include an additional component according to the implementation method. For example, the display 14 may include an LCD panel, an LCD panel driver for driving the LCD panel, and a backlight unit for supplying light to the LCD panel.

The voice recognition unit 15 may recognize the user's voice received through the first microphone 12, the remote control 4, and the like by executing the voice recognition module (voice recognition engine) stored in the first memory 13. The voice recognition unit 15 recognizes whether the user's voice is a control command for controlling the electronic device 1. The control command may include, for example, a command such as turning on or off the electronic device 1, switching a channel, and adjusting a volume. In addition, the control command may be, for example, a command requesting to display the UI provided by the external device 2 connected to the electronic device 1.

An analog voice signal received by the remote control 4 may be converted into a digital signal and transmitted to the electronic device 1 through, for example, Bluetooth. Alternatively, the voice signal received by the first microphone 12 built into the electronic device 1 itself may convert an analog voice signal into a digital signal, and transmit the digital signal to the first processor 16 of the electronic device 1. In this way, the received voice signal may be converted into text through the built-in voice recognition unit 15 of the electronic device 1.

The voice recognition unit 15 may be excluded from the electronic device 1. At this time, the received voice signal may be transmitted to the server (voice recognition server) 3.

The server (voice recognition server) 3 may be a speech to text (STT) server having only a function of converting voice signal-related data into appropriate text, or may be a main server that also performs a function of the STT server.

The STT server may transmit the processed data back to the electronic device 1 or directly to another server.

As described above, the first processor 16 of the electronic device 1 may perform a specific function using the text transmitted to the electronic device 1 or the text converted by the voice recognition unit 15 itself of the electronic device 1. In this case, the execution of the specific function may be performed based on information/data transmitted to the electronic device 1 after the converted text is transmitted to a separate server (a server different from the STT server or a server that serves as the STT server) to perform data processing.

The first processor 16 may control each component of the electronic device 1.

As the external device 2 is connected, the first processor 16 may create and cluster tables by learning the raw device information such as the Infoframe information, the CEC information, the sound information, and the resolution information received by the HDMI cable, the optical cable, and the like, and the IR code information of the external device 2 received by the IR receiving unit, analyzes rules and patterns of the cluster, classify major clusters and minor clusters, and create the device information-based recognition model that selects the main component variable that affects the recognition results.

The first processor 16 may recognize the connected external device 2 based on the received device information as the external device 2 is connected to the interface circuitry 11 and the device information-based recognition model, and control an operation, for example, the external device 2 through a multi-brand remote based on the information on the recognized external device 2.

The first processor 16 may create the image-based recognition model by learning in order to map the video content and/or the identification information of the external device 2 included in the EPG UI, for example, the information of the logo and/or the guide, the UI image and/or text in the form of the home menu, and the location and/or size of the identifier area to each brand of the external device 2.

The first processor 16 may recognize the connected external device 2 using the identification information of the external device 2 included in the video content and/or the EPG UI received by the external device 2 and the image-based recognition model, and perform the operation based on the information on the recognized external device. That is, the first processor 16 may control, for example, the recognized external device 2 through a multi-brand remote control 4 to display the video content and/or the EPG UI on the built-in or external display 14.

The first processor 16 may recognize the identification information of the external device 2 among the images by analyzing an image received from external device 2 or by streaming through a network.

The first processor 16 may recognize the external device 2 using the device information-based recognition model stored in the first memory 13, and recognize the external device 2 using the image-based recognition model when the external device 2 may not be recognized.

The first processor 16 may recognize the external device 2 using the device information-based recognition model stored in the first memory 13, and recognize the external device 2 using the image-based recognition model for brands of a plurality of external devices 2 when the brands of the plurality of external devices 2 are recognized.

The first processor 16 may recognize the external device 2 using both the device information-based recognition model and the image-based recognition model stored in the first memory 13, and then select the external device 2 commonly recognized by two recognition models.

The first processor 16 may recognize the external device 2 using the image-based recognition model stored in the first memory 13, and recognize the external device 2 using the device information-based recognition model when the external device 2 may not be recognized.

The first processor 16 may create one coupling recognition model by combining the collected image information and device information. In other words, the first processor 16 may select the recognition data associated with the mapping that correlates the logo included in an image and the Infoframe information, the CEC information, the sound information, and the resolution information with the IR code information of the external device 2 received by the IR receiving unit, the analysis of the cluster pattern, and the identification of the external device.

The recognition model for recognizing the external device may be learned by default and provided in the electronic device 1 according to design, collected and prepared during use, updated while using, or received from the server.

In particular, the first processor 16 may collect the recognition data for recognizing the external device 2, the identification information of the external device included in the image information, and the device information on the external device, and may perform at least part of the analysis and processing of the collected recognition data, and generation of the resulting information using at least one of machine learning, neural network, or deep learning algorithm as rule-based or artificial intelligence algorithm.

For example, the processor 160 may perform functions of a learning unit and a recognition unit. The learning unit may perform, for example, a function of generating a learned neural network, and the recognition unit may perform a function of recognizing (or reasoning, predicting, estimating, and determining) data using the learned neural network. The learning unit may generate or update the neural network. The learning unit may acquire learning data to generate the neural network. For example, the learning unit may acquire the learning data from the first memory 13 or the outside. The learning data may be data used for learning of the neural network, and for example, may learn the neural network using the identification information of the external device included in the image information and the device information on the external device.

The learning unit may perform a pre-processing operation on the acquired learning data before learning the neural network using the learning data, or may select data to be used for learning from among a plurality of learning data. For example, the learning unit may process or filter the learning data in a predetermined format, or process data in a form suitable for learning by adding/removing noise. The learning unit may generate the neural network configured to perform an operation of selecting the main component variable associated with, for example, the identification of the external device 2 using the pre-processed learning data.

The learned neural network may be constituted by a plurality of neural networks (or layers). The nodes of the plurality of neural networks have weights, and the plurality of neural networks may be connected to each other so that an output value of one neural network is used as an input value of another neural network. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

Meanwhile, in order to recognize the external device 2, the recognition unit may acquire target data. The target data may be acquired from the first memory 13 or from the outside. The target data may be data to be recognized by the neural network. Before applying to the target data to the learned neural network, the recognition unit may perform the pre-processing operation on the obtained target data, or select data to be used for recognition from among a plurality of target data. For example, the recognition unit may process or filter the target data in a predetermined format, filter, or add/remove noise to process data in a form suitable for recognition. The recognition unit may obtain an output value output from the neural network by applying the preprocessed target data to the neural network. According to various embodiments, the recognition unit may acquire a probability value (or a reliability value) together with the output value.

The first processor 16 includes at least one general-purpose processor that loads at least a part of the control program from the nonvolatile memory in which the control program is installed into the volatile memory and executes the loaded control program, and may be implemented as, for example, a central processing unit (CPU), an application processor (AP), or a microprocessor.

The first processor 16 may include a single core, a dual core, a triple core, a quad core, or a multiple-number core thereof. A plurality of first processors 16 may be provided. The first processor 16 may include, for example, a main processor and a sub processor operating in a sleep mode (for example, a mode in which only standby power is supplied). In addition, the processor, the ROM, and the RAM can be interconnected via an internal bus.

The first processor 16 may be implemented as a form included in a main SoC mounted on a PCB embedded in the electronic device 1. In another embodiment, the main SoC may further include an image processor.

The control program may include a program(s) implemented in at least one of a BIOS, a device driver, an operating system, firmware, a platform, and an application program (application). The application program may be pre-installed or pre-stored at the time of manufacturing of the electronic device 1, or may be installed based on data of the application program received from the outside when used later. The data of the application program may be downloaded to the electronic device 1 from an external server such as an application market. Such a server is an example of a computer program product, but is not limited thereto.

The device information-based recognition model and the image-based recognition model may be generated and updated by the electronic device 1 itself, or may be performed by the server 3 or distributed to each electronic device 1. However, since the server 3 has a large parameter of recognition data, it is possible to create or update a recognition model with a high recognition rate.

The remote control 4 may include a user input interface 42, a second microphone 44, a second communication interface 46, and a second processor 48.

The remote control 4 may be implemented as an IR remote control that transmits 2-bit control information based only on the IR signal, a multi-brand remote control (MBR) that transmits user input information input by, for example, buttons, voice, touch, drag, and the like, as an IR signal, a Bluetooth signal, a Wi-Fi signal, and the like, mobile terminals such as a smart phone in which a remote application (app) is installed, or the like.

The user input interface 42 may receive a button input through various function key buttons, a touch or drag input through a touch sensor, a voice input through the second microphone 44, a motion input through a motion sensor, and the like.

The second microphone 44 may receive a user's voice input. In this way, the received analog voice input may be converted into a digital signal and transmitted to a control target, for example, electronic device 1 through the second communication interface 46, for example, a Bluetooth communication module, a WiFi communication module, an infrared communication module, or the like. When the remote control 4 is implemented as a mobile terminal such as a smartphone having a voice recognition function, the input voice input may be transmitted to the electronic device 1 in the form of a control signal recognized through the voice recognition. The user's voice input may include a power on/off control command for the electronic device 1, a channel control command, a volume control command, a content provider's home or guide image request command, and the like.

The second communication interface 46 may transmit data such as a control command input from the user input interface 42 and a digital voice signal converted from an analog voice signal to the interface circuitry 11 of the electronic device 1.

In order to perform wireless communication, the second communication interface 46 may be configured to perform at least one communication of IR, radio frequency (RF), Wi-fi, Bluetooth, Zigbee, ultra-wide band (UWB), wireless USB, and near field communication (NFC).

The second processor 48 may control each component of the remote control 4. The second processor 48 may transmit a control command corresponding to a button input, a touch input, a drag input, and a motion input to the electronic device 1 through the second communication interface 46.

The second processor 48 may convert an analog voice signal input through the second microphone 44 into a digital voice signal and transmit the digital voice signal to the electronic device 1 through the second communication interface 46. The second processor 48 may recognize the input voice signal when the remote control 4 has the voice recognition function to transmit the corresponding control command to the electronic device 1 through the second communication interface 46.

Figure 3:
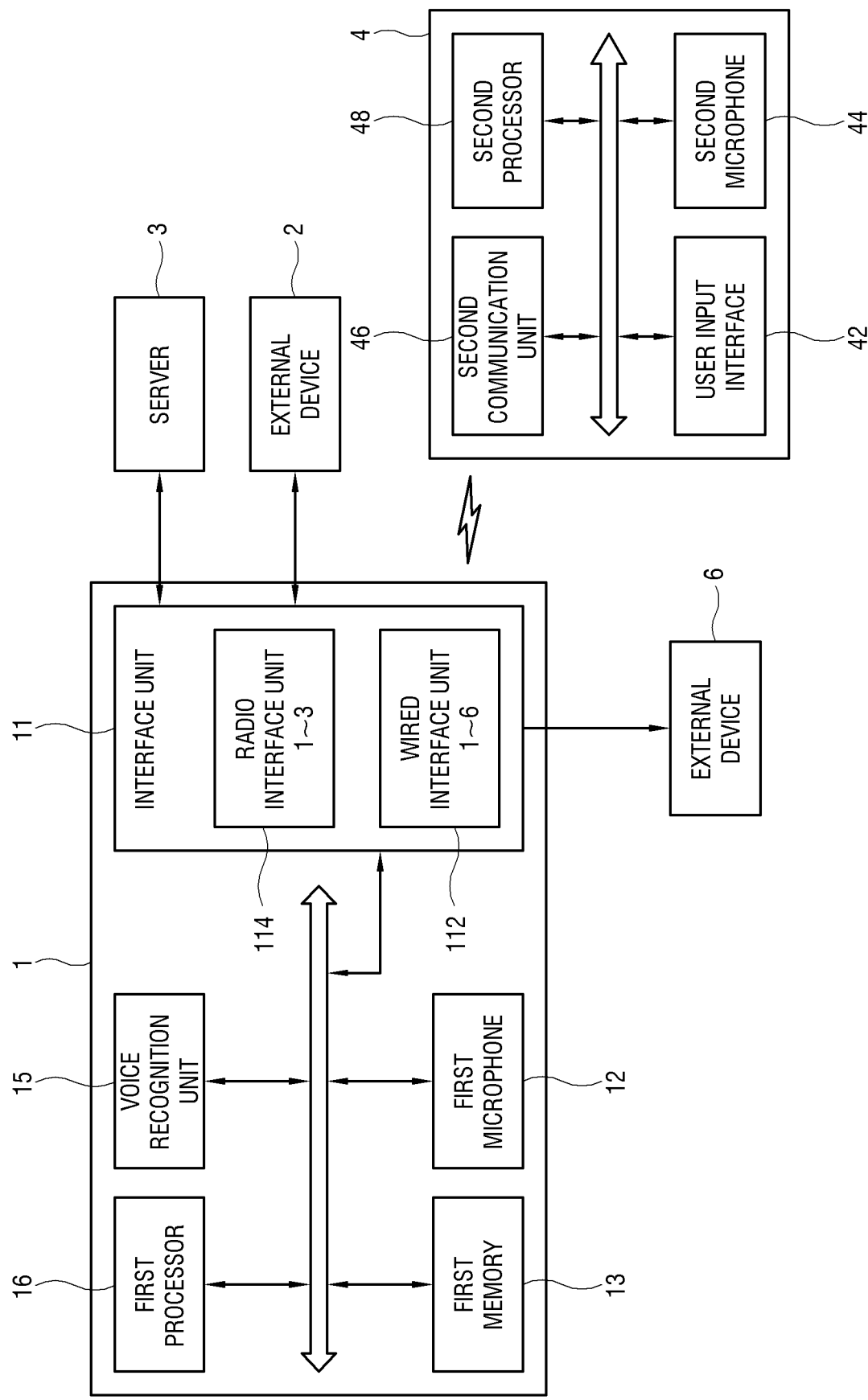
FIG. 3 is a block diagram illustrating a configuration of an electronic device according to a second embodiment of the disclosure.

FIG. 3 is a block diagram illustrating a configuration of an electronic device 1 according to a second embodiment of the disclosure. The electronic device 1 according to the second embodiment does not include a display that displays an image by itself, and may output the processed video content to the external device 6 through the interface circuitry 11, for example, the HDMI. For example, the electronic device 1 may output video to a display device and audio to an audio device.

Obviously, the electronic device 1 according to the second embodiment may include a display for displaying a simple notification of the electronic device 1, a control menu, and the like, not output of video content and/or EPG UI.

Figure 4:
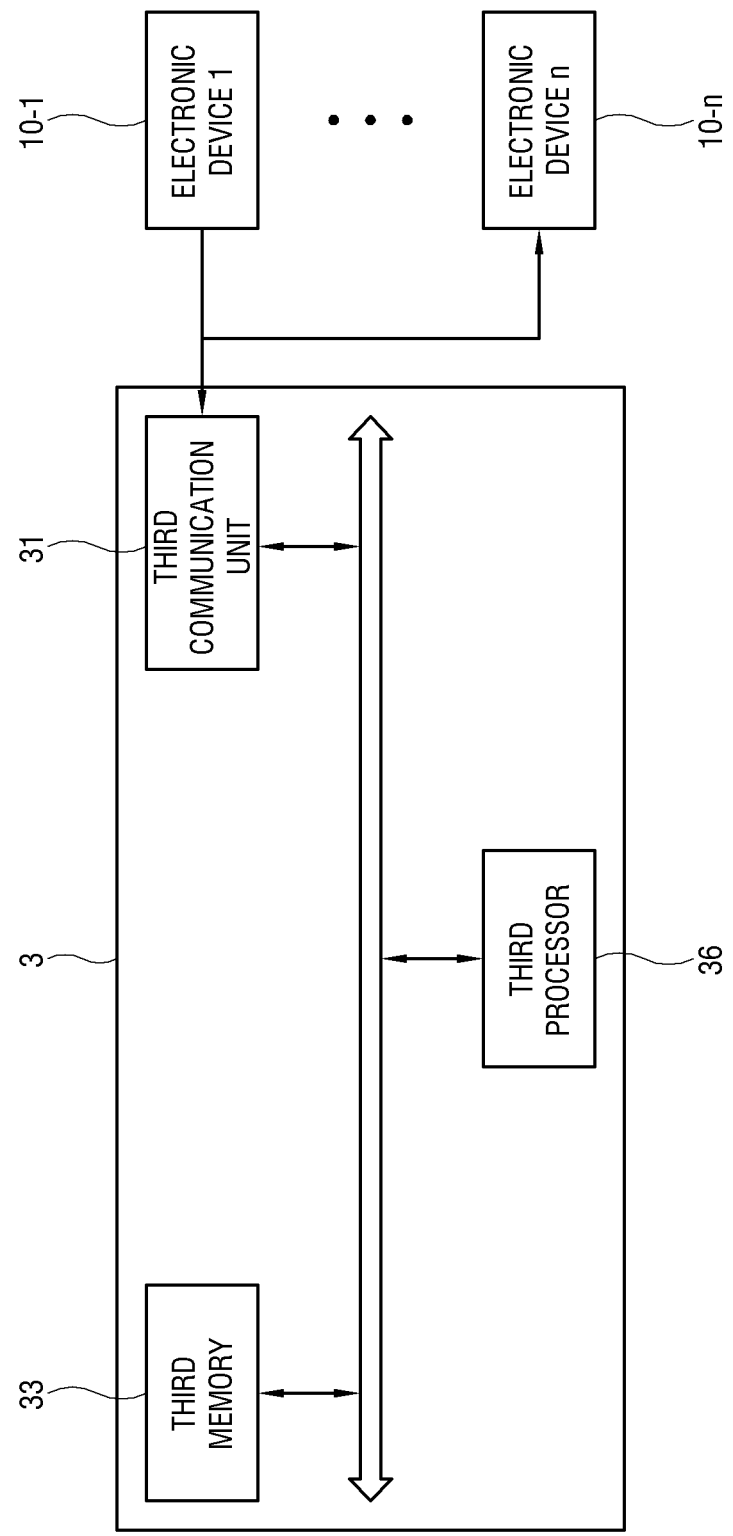
FIG. 4 is a block diagram illustrating a configuration of a server according to the embodiment of the disclosure.

FIG. 4 is a block diagram illustrating a configuration of a server 3 according to the embodiment of the disclosure.

Referring to FIG. 4, the server 3 may include a third communication interface 31, a third memory 33, and a third processor 36.

The third communication interface 31 performs network communication with a plurality of electronic devices 10-1 to 10-*n*.

The third communication interface 31 may receive device information on an external device collected when the plurality of electronic devices 10-1 to 10-*n* each manually or automatically recognize (configure) the external device 2, for example, the HDMI Infoframe information, the HDMI CEC information, the IR code information of the remote control, the resolution information, and the like.

The third communication interface 31 may receive the identification information of the external device 2 included in the video content and/or the EPG UI used when a plurality of electronic devices 10-1 to 10-*n* each recognize (configure) the external device 2, for example, information of the logo and/or guide, the UI image and/or text in the form of the home menu, and the location and/or size of the identifier area.

The third communication interface 31 may receive a device information-based recognition model and an image-based recognition model used when each of the plurality of electronic devices 10-1 to 10-*n* recognizes the external device 2.

The third communication interface 31 may transmit the device information-based recognition model, the image-based recognition model, or the like, which is collected, learned, and created under the control of the third processor 36, to the electronic devices 10-1 to 10-*n* corresponding to each external device 2.

The third communication interface 31 may receive recognition result information of the external device 2 and configuration information of recognition failure or success of the external device 2 from each of the plurality of electronic devices 10-1 to 10-*n*.

In order to perform wireless communication with, for example, the plurality of electronic devices 10-1 to 10-*n*, the second communication interface 31 may include an RF circuit that transmits/receives a radio frequency (RF) signal, and may be configured to perform at least one communication of Wi-fi, Bluetooth, Zigbee, ultra-wide band (UWB), wireless USB, and near field communication (NFC). The third communication interface 31 may perform wired communication with the plurality of electronic devices 10-1 to 10-*n* and other devices through a wired local area network (LAN). Communications can be implemented in various other communication schemes in addition to a connection unit including a connector or a terminal for wired connection.

The third memory 33 may include various types of data without limitation.

The third memory 33 may store raw data of the device information on the external device collected from each of the plurality of electronic devices 10-1 to 10-*n*, such as the HDMI Infoframe information, the HDMI CEC information, the IR code information of the remote control, the sound information, and the resolution information.

The third memory 33 may store the identification information of the external device 2 included in the video content and/or the EPG UI used when the plurality of electronic devices 10-1 to 10-*n* each recognize the external device 2, for example, the information of the logo and/or guide, the UI image and/or text in the form of the home menu, and the location and/or size of the identifier area.

The third memory 33 may store the information of the recognition (configuration) success or failure of the external device 2 collected from each of the plurality of electronic devices 10-1 to 10-*n*.

The third memory 33 may store the device information-based recognition model created by learning based on the raw data of the device information on the external device and the image-based recognition model created by learning based on the identification information of the external device included in the image data and/or the EPG UI.

The third processor 36 may learn the raw data of the collected device information, create and cluster tables, analyze certain rules and patterns, classify major cluster patterns and minor cluster patterns, and map the major cluster patterns to the main component variable that affect recognition results for each external device brand. That is, the third processor 36 may perform learning to map the device information associated with the identification of the external device among the plurality of pieces of device information and the brand and/or the IR codeset of the external device to create the device information-based recognition model and distribute the created device information-based recognition model to the electronic devices 10-1-10-*n* associated with the external device 2.

The third processor 36 may create the image-based recognition model by performing learning and verification based on the identification information of the external device included in the collected image data and/or the EPG UI, and distribute the created image-based recognition mode to the electronic devices 10-1-10-*n* associated with the external device 2.

The third processor 36 may find certain laws and trends based on the information of the recognition (configuration) success or failure of the plurality of external devices 2 collected from each of the electronic devices 10-1 to 10-*n*, and may make an artificial intelligence engine that may determine the configuration of the external device by performing machine learning or deep learning on the found laws and trends.

Figure 5:
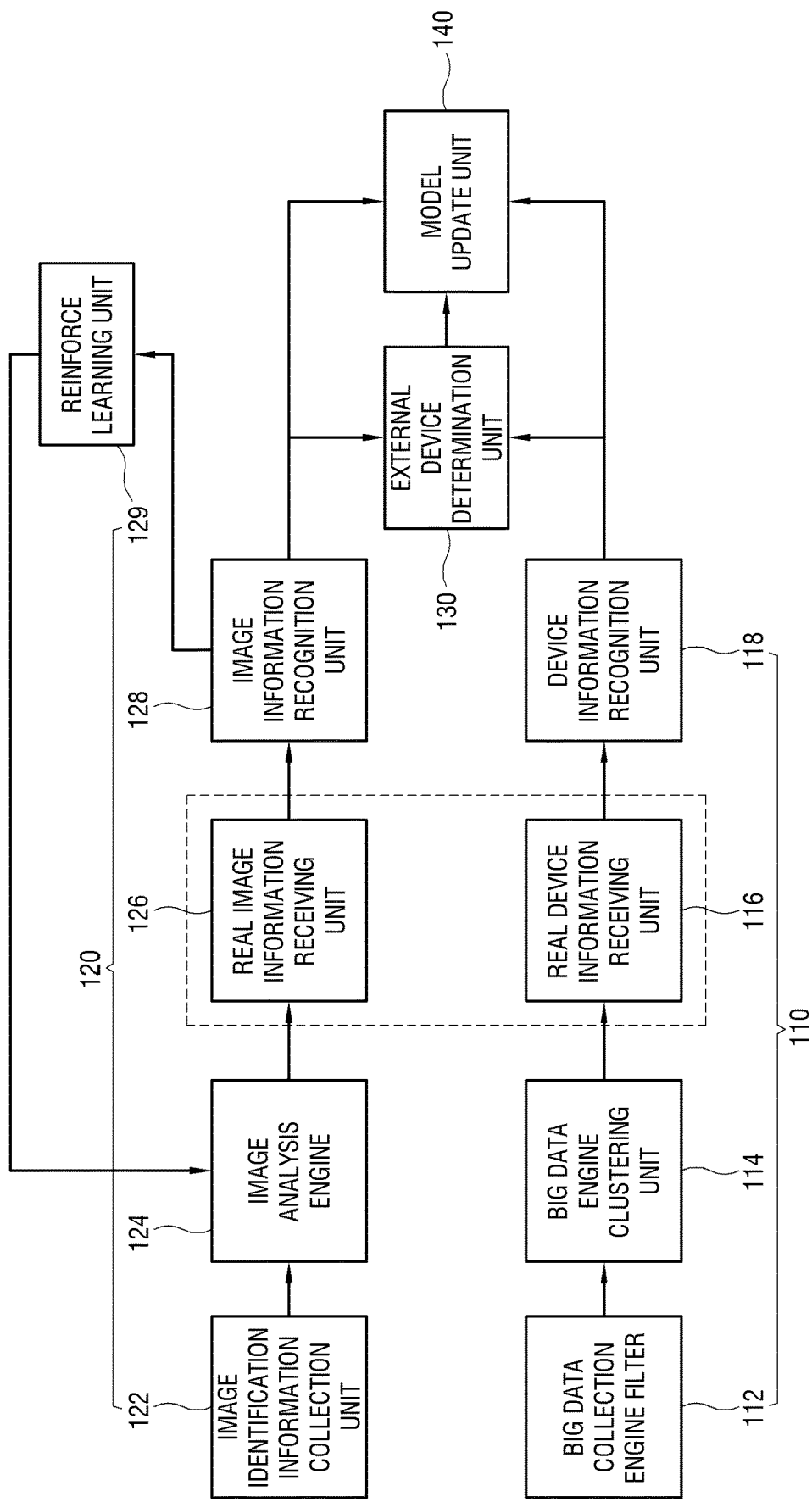
FIG. 5 is a block diagram illustrating a configuration for recognizing and processing an external device by complementarily using a device information-based recognition model and an image-based recognition model in an electronic device according to an embodiment of the disclosure.

FIG. 5 is a block diagram illustrating a configuration for recognizing and processing the external device by complementarily using the device information-based recognition model and the image-based recognition model in the electronic device 1 according to the embodiment of the disclosure. The electronic device 1 may include a first recognition processing unit 110 using the device information-based recognition model, a second recognition processing unit 120 using the image-based recognition model, an external device determination unit 130, and a model update unit 140.

The first recognition processing unit 110 may include a big data collection engine filter 112, a big data engine clustering unit 114, a real device information receiving unit 116, and a device information recognition unit 118.

The big data collection engine filter 112 may collect, as big data of the device information on the external device, the Infoframe information, the consumer electronics control (CEC) information, the sound information, the resolution information, and the IR code information of the remote control of the external device 2 received by connecting the HDMI cable or the optical cable 5 for connection of the external device 2. Here, the device information on the big data is automatically or manually recognized when the electronic device 1 recognizes the external device 2, or may include the device information on the external device 2 when the recognition fails or succeeds, and the device information on the external device 2 which is directly received from a third electronic device or received via the server 3.

The big data engine clustering unit 114 may cluster the collected device information on the external device 2. The electronic device 1 may cluster the plurality of pieces of device information, analyze certain rules and patterns, classify major cluster patterns and minor cluster patterns, and create the device information-based recognition model learned to map the major cluster patterns to the main component variable that affects recognition results for the external device brand.

The real device information receiving unit 116 may receive the device information on the external device as the connected external device 2 used for real-time recognition is connected.

As the external device 2 to be recognized is connected, the device information recognition unit 118 may perform learning for the recognition of the external device 2, such as machine learning or deep learning, using the device information and the device information-based recognition model actually received. At this time, it may take a very long time to perform learning in order to recognize, as a target, external devices of all brands around the world. Therefore, the electronic device 1 may quickly and accurately perform the recognition of the external device 2 based on the device information-based recognition model by performing filtering to limit the brand or code of the external device having a history of being serviced in the corresponding area or previously connected, and then applying the device information-based recognition model to the brand or IR codeset group of the small external device filtered.

The second recognition processing unit 120 may include an image identification information collection unit 122, an image analysis engine 124, a real image information receiving unit 126, an image information recognition unit 128, and a reinforce learning unit 129.

The image identification information collection unit 122 may collect, from the image data received from the connected external device 2, the identification information capable of identifying the brand of the external device 2 such as the information of the logo and/or the guide, the UI image and/or text in the form of the home menu, and the location and/or size of the identifier area. Here, the collected identification information is automatically or manually recognized when the electronic device 1 recognizes the external device 2, or may include the identification information of the brand of the external device 2 when the recognition fails or the recognition succeeds, and the device information on the brand of the external device 2 which is directly received from a third electronic device or received via the server 3.

The image analysis engine 124 may create the image-based recognition model by learning and verifying the collected identification information of the brands of the plurality of external devices 2.

The real image information receiving unit 126 may receive the identification information, for example, image information including a location of a specific identification area, the size of the identification area, and the logo from the external device 2 to be recognized.

The image information recognition unit 128 may recognize the brand of the external device 2 using the identification information included in the image information and the image-based recognition model, for example, a convolutional neural network (CNN) model. Here, the electronic device 1 may perform the recognition of the external device 2 based on the area information in which the electronic device 1 is located by performing the pre-filtering with the brand or the IR codeset group of the external device having a history of being serviced in the area and/or previously connected, and then applying the image-based recognition model to the brand or IR codeset group of the small external device filtered.

When the recognition of the external device 2 fails using on the image-based recognition model or the device information-based recognition model, the reinforce learning unit 129 may perform reinforce learning in which the information of the recognition failure is reflected to the recognition model and updated.

The external device determination unit 130 may finally determine the external device based on the brand or the IR codeset group of the external device recognized by the first recognition processing unit 110 and the brand or the IR codeset group of the external device recognized by the second recognition processing unit 120. The external device determination unit 130 may finally determine the brand or the IR codeset of the external device matching each other in the brand or the IR codeset group of the external device recognized by the first recognition processing unit 110 and the brand or the IR codeset group of the external device recognized by the second recognition processing unit 120. The external device determination unit 130 may determine that the recognition fails when there is no brand or IR codeset of the external device matching each other in the brand or the IR codeset group of the external device recognized by the first recognition processing unit 110 and the brand or the IR codeset group of the external device recognized by the second recognition processing unit 120.

The model update unit 140 may collect the recognition failure information from the device information recognition unit 118 and the image information recognition unit 128, and the recognition success information from the external device determination unit 130, and reflect the collected recognition failure information and recognition success information to the recognition model, that is, the device information-based recognition model and the image-based recognition model, thereby performing the update.

In this way, when both the device information-based recognition model and the image-based recognition model are used, the recognition rate of the external device 2 can be greatly increased.

The electronic device 1 may recognize the external device by independently performing the first recognition processing unit 110 using the device information-based recognition model and the second recognition processing unit 120 using the image-based recognition model, respectively.

The device information-based recognition model and the image-based recognition model used when the external device is recognized may include a model of the learning step and a model of the recognition step, or may be composed only of a model of the recognition step.

Figure 6:
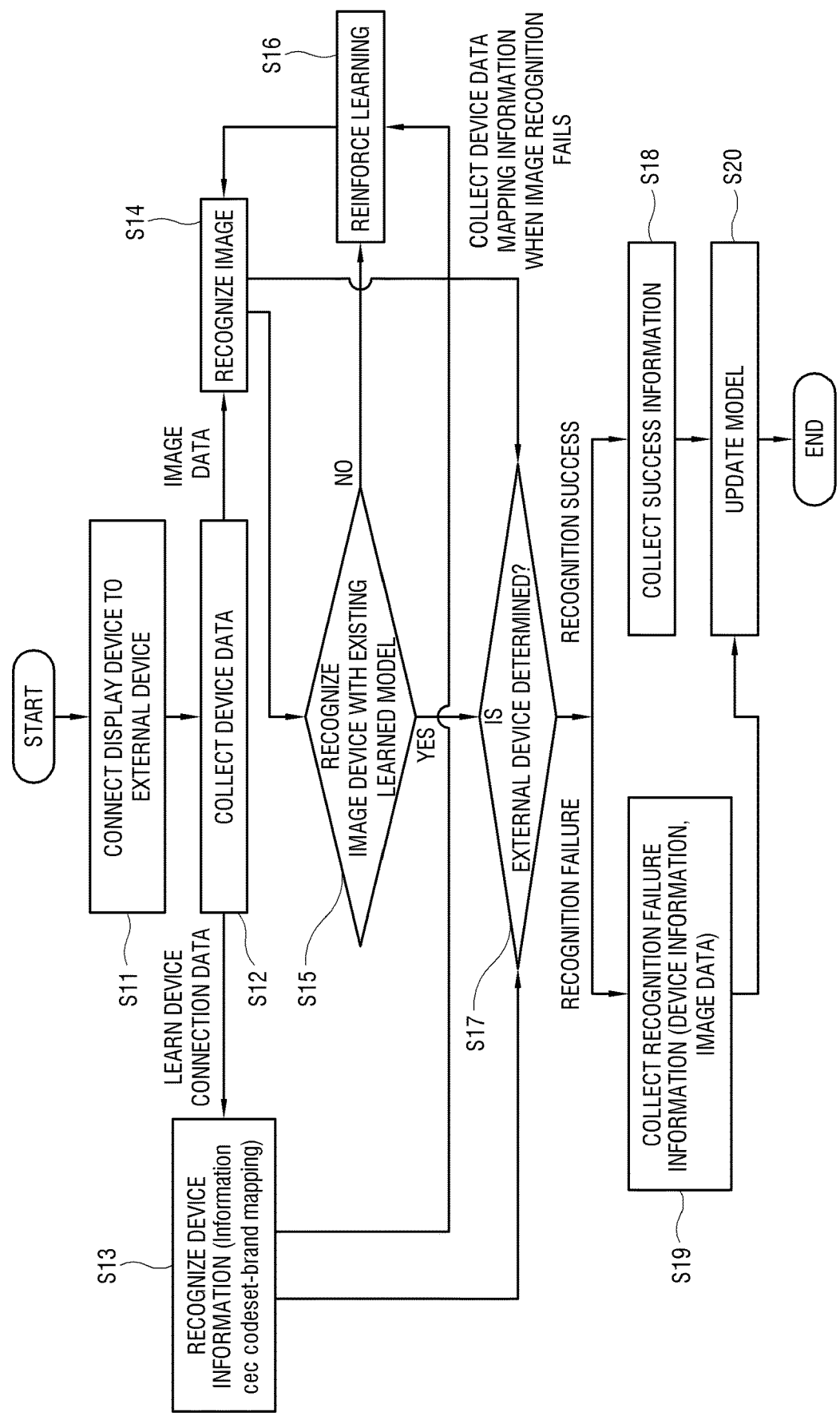
FIG. 6 is a flowchart illustrating a method for processing recognition of an external device by the electronic device of FIG. 5.

FIG. 6 is a flowchart illustrating a method for processing recognition of an external device by the electronic device 1 of FIG. 5.

In operation S11, the electronic device 1 may be connected to the external device 2 by the HDMI cable or the optical cable.

In operation S12, as the external device 2 is connected to the electronic device 1, the electronic device 1 may receive image information including the logo or the UI, and the device information on the external device 2, such as the Infoframe information, the consumer electronics control (CEC) information, the sound information, the resolution information, and the IR code information of the remote control of the external device 2.

In operation S13, the first recognition processing unit 110 may identify the connected external device 2 based on the device information on the external device received in operation S12, such as the Infoframe information, the consumer electronics control (CED) information, the sound information, the resolution information, and the IR code information of the remote control of the external device 2, and the device information-based recognition model. When the recognition succeeds, the recognition result may be used in operation S17. When the recognition fails, the recognition failure information may be used in operation S16.

In operation S14, the second recognition processing unit 120 may recognize the external device based on the logo or the UI included in the image data received in operation S12, and the image-based recognition model. When the recognition succeeds, the recognition result can be used in operation S17. When the recognition fails, operation S15 may be performed.

In operation S15, the second recognition processing unit 120 may recognize the connected external device 2 based on the existing image-based recognition model as the recognition fails in operation S14. When the recognition succeeds, the recognition result can be used in operation S17. When the recognition fails, the recognition failure information may be used in operation S16.

In operation S16, the second recognition processing unit 120 may perform the reinforce learning that is reflected to the recognition model by using the recognition failure information transmitted in operations S13 and S15.

In operation S17, the external device determination unit 130 may finally determine the external device based on the brand or the IR codeset of the external device recognized by the first recognition processing unit 110 and the brand or the IR codeset of the external device recognized by the second recognition processing unit 120. When the recognition succeeds, operation S18 may be performed. When the recognition fails, the recognition failure information may be used in operation S19.

In operation S18, the model update unit 140 may collect the recognition success information in operation S17.

In operation S19, the model update unit 140 may collect the recognition failure information in operation S17.

In operation S20, the model update unit 140 may perform the update by reflecting the recognition success information and the recognition failure information collected in operations S18 and S19 to the device information-based recognition model and the image-based recognition model.

Figure 7:
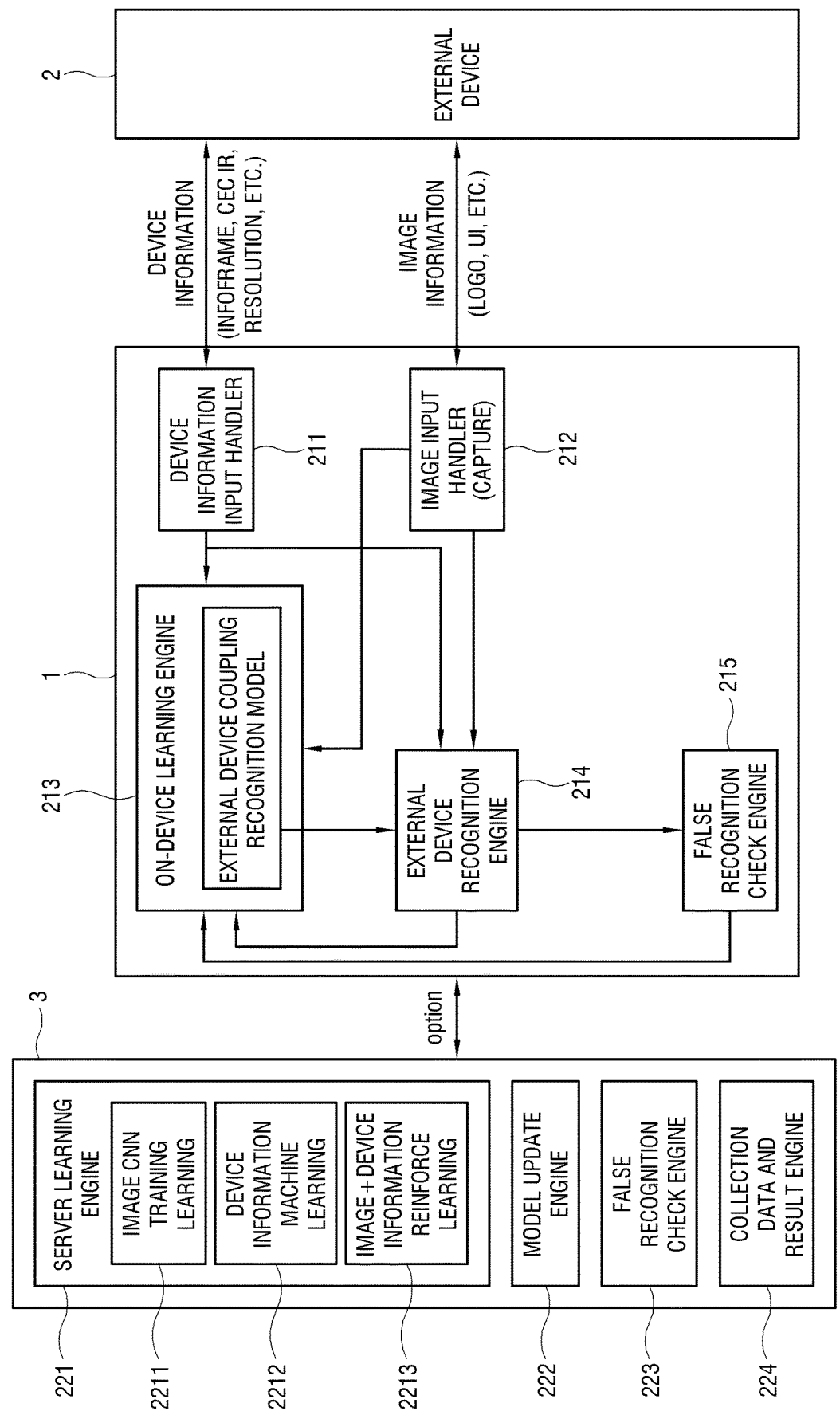
FIG. 7 is a block diagram illustrating a configuration for recognizing and processing an external device using a coupling recognition model in which device information on the external device and identification information of the external device included in image data are combined in the electronic device and the server.

FIG. 7 is a block diagram illustrating a configuration for recognizing and processing an external device using a coupling recognition model in which device information on the external device and identification information of the external device 2 included in image data are combined in the electronic device 1 and the server 3.

As the electronic device 1 is connected to the external device 2 by the HDMI cable or the optical cable 5, the electronic device 1 may receive the image information that includes the Infoframe information, the consumer electronics control (CEC) information, the sound information, the resolution information, and the IR code information of the remote control of the external device 2 as the device information on the external device and the logo as the identification information for identifying the external device 2.

The electronic device 1 may include a device information input handler 211, an image input handler 212, an on-device learning engine 213, an external device recognition engine 214, and a false recognition check engine 215.

The device information input handler 211 may process the input device information on the external device, such as the Infoframe information, the consumer electronics control (CEC) information, the sound information, the resolution information, and the IR code information of the remote control of the external device 2. The device information input handler 211 may connect the brand and/or IR codeset information of the external device 2 for each input device information. The device information processed in this way may be transmitted to the on-device learning engine.

The image input handler 212 may capture the logo or the UI from the input image information, and connect the brand and/or the IR codeset information for each logo. The captured logo processed in this way may be transmitted to the on-device learning engine 213.

The on-device learning engine 213 may create an external device coupling recognition model by using both the device information and the capture logo transmitted from the device information input handler 211 and the image input handler 212. In this case, the external device coupling recognition model may be formed through mapping, clustering, pattern analysis, and main component variable selection of related data.

The on-device learning engine 213 may generate a mapping table in which the logo, the Infoframe information, the consumer electronics control (CEC) information, the sound information, the resolution information, and the IR codeset information of the remote control are connected to the brand and/or IR codeset of the external device 2.

The on-device learning engine 213 may cluster the logo, the Infoframe information, the CEC information, the sound information, the resolution information, and the IR codeset information for each brand of the external device 2 in the mapping table.

The on-device learning engine 213 may analyze the rule and pattern of the clustered data, that is, the logo, and the Infoframe information, the CEC information, the sound information, the resolution information, and the IR codeset information for each brand of the external device 2.

The on-device learning engine 213 can be classified into a major cluster and a minor cluster according to the rule and pattern analysis.

The on-device learning engine 213 may select the major cluster pattern as the main component variable that affects the recognition results for each external device brand, and create the coupling recognition model.

The external device recognition engine 214 may perform the recognition of the external device based on the device information, the captured logo, and the external device coupling recognition model transmitted from the device information input handler 211 and the image input handler 212, respectively. The external device recognition engine 214 may transmit the recognition success information to the on-device learning engine 213 to be reflected to the external device coupling recognition model.

The false recognition check engine 214 may check the recognition failure information in the external device recognition engine 214, and transmit the checked recognition failure information to the on-device learning engine 213 to be reflected to the external device coupling recognition model.

The generation of the external device coupling recognition model may optionally be performed on the server 3. The server 3 may collect a lot of recognition data from a plurality of electronic devices connected through a network. As a result, the server 3 may generate a coupling recognition model having a higher recognition rate based on large data.

The server 3 may include a server learning engine 221, a model update engine 222, a false recognition check engine 223, and a collection data and result engine 224.

The server learning engine 221 may perform video CNN training learning 2211, device information machine learning 2212, and image information and device information reinforce learning 2213.

The image CNN training learning 2211 may extract and learn the external device identification information, for example, the logo or UI image included in the collected image information, and associate and map the extracted and learned identification information of the external device with each brand and/or IR codeset of the external device.

The device information machine learning 2212 may learn the device information on the external device collected in advance, such as the Infoframe information, the CEC information, the sound information, the resolution information, and the IR codeset information, and associated and map the learned device information with each brand and/or IR codeset of the external device.

The reinforce learning 2213 may reinforce the recognition model through complementary mapping, clustering, pattern analysis, and main component variable selection of the device information on the external device and the identification information of the external device included in the image data.

The model update engine 222 may update the recognition model by distributing the recognition model to the plurality of electronic devices 1 connected through the network when the recognition model is changed by newly collected data.

The false recognition check engine 223 may check the recognition failure information received from the plurality of electronic devices 1 connected through the network. The recognition failure information checked in this way may be transmitted to the server learning engine 221.

The collected data and result engine 224 may collect data and recognition success information acquired when manually or automatically recognized from the plurality of electronic devices 1 connected through the network.

Figure 8:
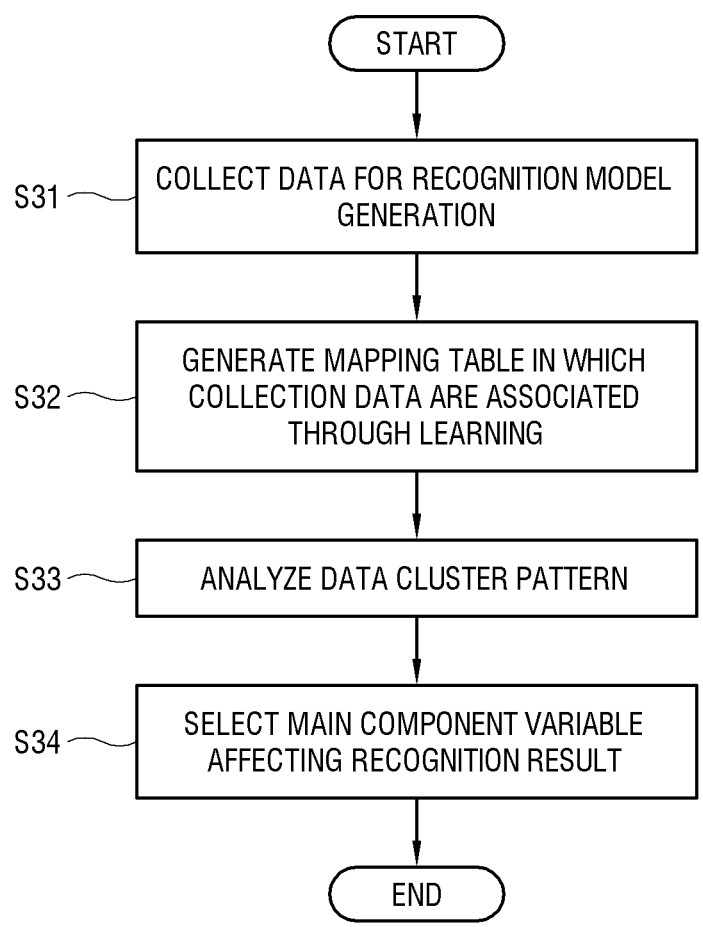
FIG. 8 is a flowchart illustrating a method for creating an external device recognition model of an electronic device or a server.

FIG. 8 is a flowchart illustrating a method for creating an external device recognition model of the electronic device 1 or the server 3. The method for creating an external device recognition model may include collecting the device information on the external device in advance (S31), creating a mapping table in which the collected data are associated through learning (S32), analyzing a data cluster pattern through the mapping table (S33), and generating a main component variable that affects the recognition result through the cluster pattern analysis (S34).

In operation S31, the electronic device 1 or the server 3 may collect the device information on the external device in advance. The device information may collect the raw recognition data acquired when the electronic device 1 manually or automatically recognizes (configures) the external device 2. The raw recognition data may include information of the recognition failure as well as the recognition success.

FIGS. 9 to 11 each are tables showing the row recognition data of the device information.

Referring to FIG. 9, in data #1 to 5 of the recognition success of the external device brand, there is no CEC information, in which in the data #1, the external device brand is A, the codeset is C1234, the Infoframe is an external device model a, and the count is 374, in the data #2, the external device brand is F, the codeset is C1234, the Infoframe is an external device model a1, and the count is 138, in the data #3, the external device brand is G, the codeset is S4567, the Infoframe is the external device model a, the count is 74, in the data #4, the external device brand is D, the codeset is C1234, the Infoframe is an external device model a2, and the count is 63, and in the #5, the external device brand is E, the codeset is S4567, the Infoframe is the external device model a, and the count is 61. The external device recognition model may connect the codeset and Infoframe of recognition success data #1 to 5 according to the external device brand.

Referring to FIG. 10, in recognition failure data #6 and 7 of the external device brand, data #6 shows that the external device brand is A, the CEC is an external device model b, the codeset is C1234, the Infoframe is an external device model c, and the count is 1, and the data #7 shows that the external device brand is H, the CEC is the external device model b, the codeset is S4567, the Infoframe is an external device model c1, and the count is 1. When creating the recognition model, the external device model c of the Infoframe information and the external device model b of the CEC information may be excluded from the connection to an external device brand A, and the external device model c1 of the Infoframe information and the external device model b of the CEC information may be excluded from the connection to an external device brand H.

Referring to FIG. 11, in recognition success data #8 and 9 of the external device brand, data #8 shows that the external device brand is C, the CEC is the external device model b, the codeset is S4567, the Infoframe is the external device model c, and the count is 399, and the data #9 shows that the external device brand is J, the CEC is the external device model b, the codeset is C1234, the Infoframe is the external device model c1, and the count is 374. When creating the recognition model, the recognition model in which the CEC is the external device model b, the codeset is S4567, and the Infoframe is the external device model c may be connected to the external device brand C, and the recognition model in which the CEC is the external device model b, the codeset is C1234, and the Infoframe is the external device model c1 may be connected to an external device brand J.

In operation S32, the electronic device 1 or the server 3 may learn the row recognition data collected in operation S31 to generate the mapping table in which the collected data is associated.

FIG. 12 is the mapping table in which the collected data is associated. Referring to FIG. 12, the mapping table in which the collected data is associated shows results of repetitive learning to map IR codes 1 to 8 to external device brands D to N. Each external device brand may represent a single IR code value or two IR code values. The mapping table illustrated in FIG. 12 is an example for description and is not limited thereto.

In operation S33, the electronic device 1 or the server 3 may analyze the cluster pattern based on a data ratio recorded in the mapping table created in operation S32. The collected recognition data may be generated as the major cluster pattern and the minor cluster pattern by analyzing the correlation pattern. The electronic device 1 or the server 3 may allocate weights, such as an image recognition weight or a device data engine, for each external device brand or each external device model after generating the cluster pattern.

When the user inputs the recognition data, the electronic device 1 or the server 3 may learn the external device brand and the code set setting data, learn the data ratio, and check whether the user is in another external device brand.

Figure 13:
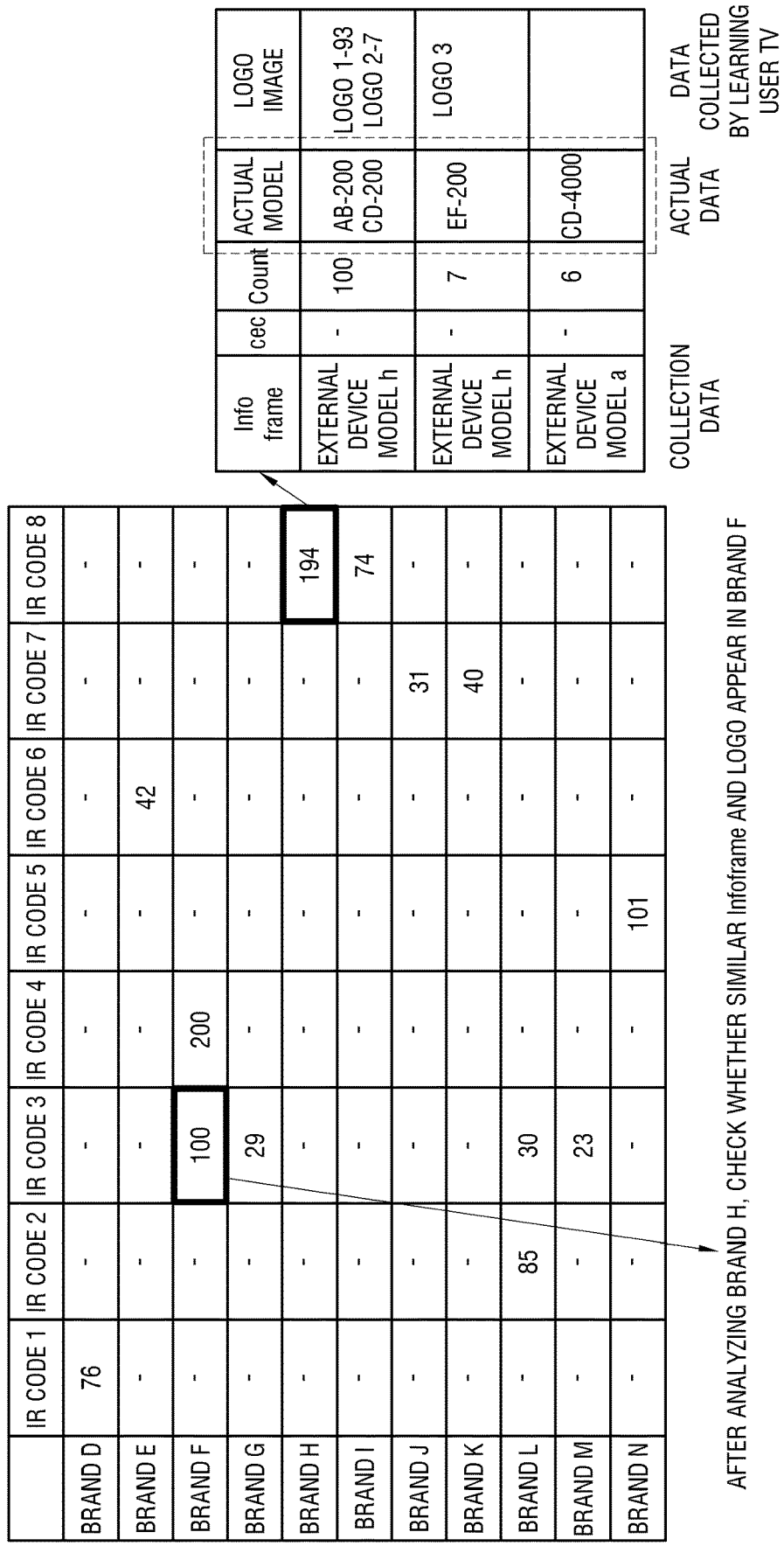
FIG. 13 is a table showing a detailed analysis of clusters of an external device brand H and codeset IR code 8 illustrated in FIG. 12.

FIG. 13 is a table showing a detailed analysis of clusters of the external device brand H and the codeset IR code 8 illustrated in FIG. 12. Referring to FIG. 13, the external device brand H and the IR code 8 may be classified into data groups 1 to 3. In data group 1, the Infoframe information as the collected data shows an external device model h and the count shows 100, the actual model as the actual data shows AB-200 and CD-200, and the logo image as the data collected by learning by the user shows logo 1 and logo 2. Here, the logo 1 corresponding to the external device model h of the Infoframe information shows 93 times count and the logo 2 shows 7 times count. In data group 2, the Infoframe information as the collected data shows an external device model h and the count shows 7, the actual model as the actual data shows EF-200, and the logo image as the data collected by learning by the user shows logo 3. In data group 3, the Infoframe information as the collected data represents an external device model a and the count is 6, and the actual data as the actual data indicates CD-4000. The external device brand H has the largest number of logos 1 of the data group 1 among the data groups 1 to 3.

If in the external device brand H and the codeset IR code 8, all the external device models h of the Infoframe information are shown, and in other external device brands, the external device model h of the Infoframe information is not shown, the external device model h of the Infoframe information may be determined as relevant device information that may identify the external device brand H.

If in the external device brand H and the codeset IR code 8, all the external device models h of the Infoframe information are shown, and in other external device brands, the external device model h of the Infoframe information is not shown, the external device model h of the Infoframe information may be determined as the device information associated with the plurality of external device brands.

Similarly, in the mapping table, it is possible to analyze the cluster pattern of the Infoframe information and the logo image for other external devices, such as external device brand F, codeset IR code 3, and count 100.

The external device recognition model may be created through the analysis of such a cluster pattern. The modeling of the recognition model can be divided into initial modeling and comparative modeling.

In the initial modeling, when there is no existing recognition model, the result of the cluster analysis may be analyzed to count the number of times from other external device brands, and then it may be determined based on the analysis results whether data is associated with the identification of the external device. If the number of times from other external device brands occurs 5 times or 1% or more, analyzed data can be excluded from the data related to the identification of the external device.

If the number of user manual inputs is accumulated, for example, 100 times or more, the determination learning may be performed. The determination learning may be implemented by mapping the external device brand, code set, Infoframe, CEC, and logo for each of the number of times of attempts 1 to 100 of the user manual input, and then analyzing the cluster pattern.

Comparative modeling can be performed by comparing values contained in an existing recognition model. In the comparative modeling, if an exception occurs more than 5 times in 100 or more attempts during automatic recognition (configuration), it is determined as a recognition failure, and an error may be determined by checking the number of times of attempts and the number of times of occurrence of error. That is, the recognition failure determination may determine errors by analyzing an area where the data at the time of user input and the data at the time of automatic setting overlap, and determining when the overlapping area exceeds a certain level. When the user input data in the manual setting compared to the automatic setting is 10 to 1, it may be determined that there is an error.

Figure 14:
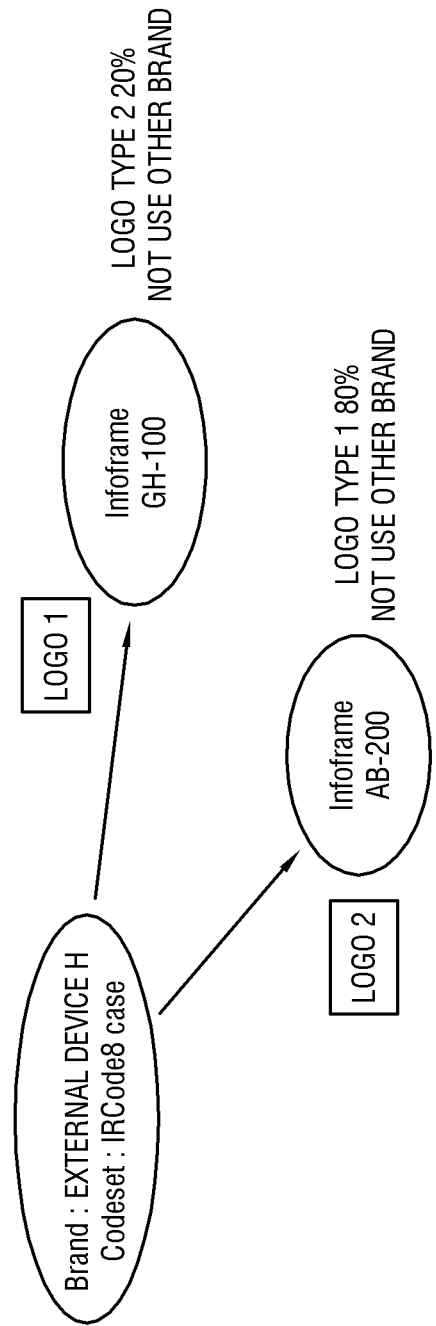
FIG. 14 is a diagram for describing a generation of a pattern of an initial recognition model for the external device brand H and the codeset IR code 8.
Figure 15:
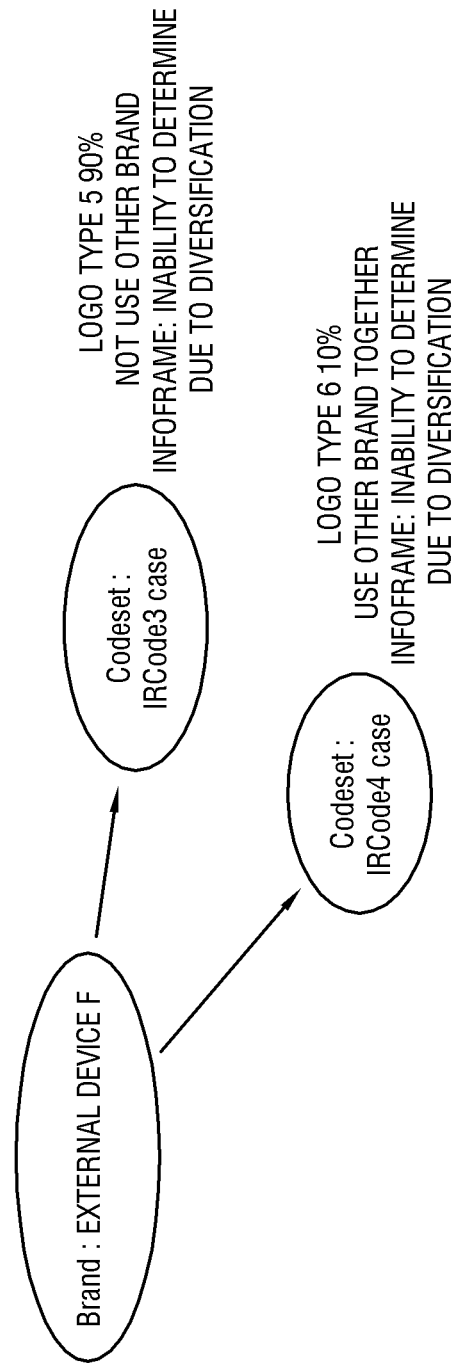
FIG. 15 is a diagram illustrating generation of a pattern of an initial recognition model for an external device brand F.

FIGS. 14 and 15 are diagrams for describing a generation of patterns of initial recognition models for the external device brand H, the codeset IR code 8, and the external device brand F.

Referring to FIG. 14, in the external device brand H, Infoframe GH-100 is logo 2 type 20%, and Infoframe AB-200 is logo 1 type 80%, all of which are not used by other external device brands. Therefore, for the external device brand H, the IR code, the Infoframe, and the logo may be determined as the main component variables.

Referring to FIG. 15, in the external device brand F, the codeset IR code 3 is logo 5 type 90% and is not used by other external device brands, the Infoframe is used in a plurality of external device brands, the codeset IR code 4 is logo 6 type 10% and is used in other external device brands, and the Infoframe is used in a plurality of external device brands. Therefore, for the external device brand H, the IR code and the logo may be determined as the main component variables.

Figure 16:
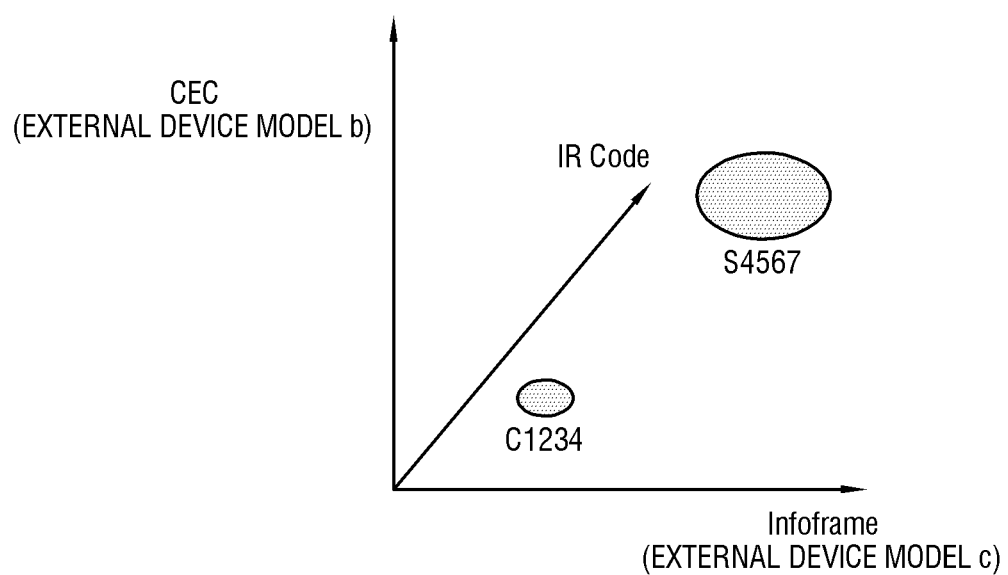
FIG. 16 is a diagram illustrating cluster patterns of IR codes for an external device model b of CEC and an external device model c of Infoframe.

FIG. 16 is a diagram illustrating a cluster pattern of IR codes for the external device model b of the CEC and the external device model c of the Infoframe. Referring to FIG. 16, most of the IR code cluster patterns of the external device model b and the external device model c indicate S4567, and only a few thereof indicate C1234. As a result, the cluster pattern can be classified as recognition failure if indicating C1234 of the IR code in the external device model b and the external device model c.

Figure 17:
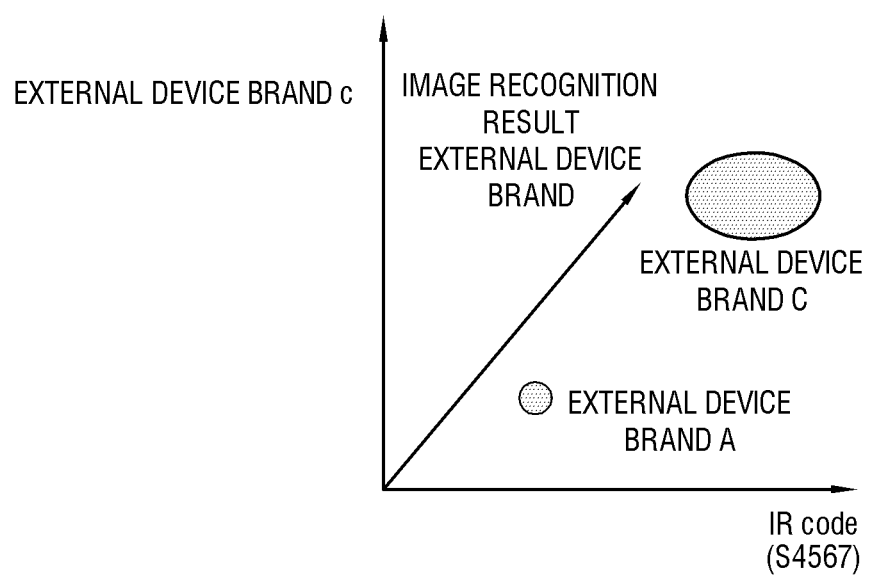
FIG. 17 is a diagram illustrating a cluster pattern of the external device brand according to a logo recognition result for brand C and codeset information S4567 of the external device.

FIG. 17 is a diagram illustrating cluster patterns of the external device brands of logo recognition results for the external device brand C and S4567 of the codeset information. Referring to FIG. 17, most of the cluster patterns are logo-recognized as the S4567 of the codeset information and the external device brand C and, but only a few thereof are logo-recognized as the S4567 of the codeset information and the external device brand A. As a result, if the cluster pattern is logo-recognized as the S4567 of the codeset information and the external device brand A, the cluster pattern can be classified as recognition failure.

As described above, the cluster pattern may be analyzed by being classified as a cluster by learning HDMI Infoframe, CEC, and IR code mapping as big data, and then classified as false recognition when a value with a small cluster is found.

In operation S34, the main component variable associated with the identification of an external device may be selected through the cluster pattern analysis performed in operation S33 on the collected recognition data, such as logo and Infoframe information, CEC information, and IR codeset information. The main component variables associated with the identification of the external device are recognition data representing major cluster patterns in the cluster pattern analysis and may be treated as the recognition success information. On the other hand, the recognition data representing the minor cluster pattern may be treated as the recognition failure information.

FIG. 18 illustrates an example of a mapping table in which the external device brand and the codeset are connected to the main component variables. Referring to FIG. 18, the mapping table may include a logo DB, continuous codeset transmission, Infoframe, CEC, and other information (resolution) as the main component variables. There is no external device brand in the logo DB, and the codeset groups can be connected. In the codeset continuous transmission, the brand group and one codeset may be connected. The Infoframe may be connected to the brand group and the code set group or to one code set. There is no external device brand in the CEC, and the codeset group can be connected. There is no external device brand in the CEC, and the codeset group can be connected.

The external device brand and the code set information that serve content can be classified by region around the world, for example, country, state, and province. Therefore, when performing the recognition based on the image information received from the connected external device 2, the device information on the external device, the image-based recognition model, the device information-based recognition mode, and the coupling recognition model, the electronic device 1 according to the embodiment of the disclosure may perform the recognition after pre-filtering the external device brand and the codeset based on the information of the area in which the electronic device 1 is located.

The external device recognition engines using the external device recognition model according to the embodiment of the disclosure may be implemented as a computer program product stored in the first memory 13 as a computer-readable storage medium or a computer program product transmitted and received through network communication. In addition, the above-described recognition engines may be implemented as a computer program alone or integrated.

The computer program according to the embodiment of the disclosure may recognized the connected external device based on the recognition model learned to map between device information related to the identification of the external device among the plurality of pieces of device information on the external device collected in advance and the external device, and execute the operation based on the information of the recognized external device.

As described above, the electronic device according to the disclosure may quickly and automatically recognize the external device using the device information on the external device received from the connected external device, such as the HDMI Infoframe information, the HDMI CEC information, the IR code information of the remote control of the external device, the resolution information, and the sound information.

In addition, the electronic device according to the disclosure may greatly improve the recognition rate of the external device by using both the image-based recognition engine using the identification information of the external device included in the image received from the external device, such as the logo or the UI, and the device information-based recognition engine using the device information on the external device.

What is claimed is:

1. An electronic device, comprising:
   a display;
   an interface circuitry configured to be connected to an external device; and
   a processor configured to:
   control the display to display an image based on an image signal received from the external device which is connected through the interface circuitry,
   obtain device information of the connected external device on a device characteristic of the connected external device received from the connected external device,
   obtain a plurality of first pieces of identification information of based on an image-based recognition model, wherein the image-based recognition model learns the identification information identified from an identifier area in a displayed image provided by each of a plurality of external devices, the identifier area being located to correspond to a provider of each of the plurality of external devices,
   obtain a plurality of second pieces of identification information based on a device information-based recognition model, wherein the device information-based recognition model learns a relation between device characteristics of the plurality of external devices and identification information of providers of the plurality of external devices,
   identify one identification information commonly included in the plurality of first pieces of identification information and the plurality of second pieces of identification information, as identification information of a provider of the connected external device, and
   perform an operation based on the identification information of the provider of the connected external device.

2. The electronic device of claim 1, wherein the device information-based recognition model is learned to map a plurality of pieces of pre-stored device information associated with the plurality of external devices to an electronic device brand and/or an external device control code.

3. The electronic device of claim 2, wherein the processor is configured to identify the provider of the connected external device based on the image received from the external device.

4. The electronic device of claim 3, wherein the processor is configured to identify the provider of the connected external device based on at least one of a logo or a UI included in the received image.

5. The electronic device of claim 3, wherein the processor is configured to generate the pre-stored device information in a cluster pattern according to the external device brand.

6. The electronic device of claim 2, wherein the pre-stored device information is assigned a recognition weight according to the external device brand.

7. The electronic device of claim 1, wherein the processor is configured to select the external device based on area information using an IP address to which the electronic device is connected.

8. The electronic device of claim 1, wherein the device information includes at least one of HDMI Infoframe information, HDMI CEC information, IR code information, sound information, or resolution information.

9. A control method of an electronic device, comprising:
   connecting with an external device;
   controlling a display to display an image based on an image signal received from the connected external device;
   obtaining device information of the connected external device on a device characteristic of the connected external device received from the connected external device;
   obtaining a plurality of first pieces of identification information based on an image-based recognition model, wherein the image-based recognition model learns the identification information identified from an identifier area in a displayed image provided by each of a plurality of external devices, the identifier area being located to correspond to a provider of each of the plurality of external devices;

obtaining a plurality of second pieces of identification information based on a device information-based recognition model, wherein the device information-based recognition model learns a relation between device characteristics of the plurality of external devices and identification information of providers of the plurality of external devices;

identifying one identification information commonly included in the plurality of first pieces of identification information and the plurality of second pieces of identification information, as identification information of a provider of the connected external device; and performing an operation based on the identification information of the provider of the connected external device.

10. The control method of claim 9, wherein the device information-based recognition model is learned to map a plurality of pieces of pre-stored device information associated with the plurality of external devices to an electronic device brand and/or an external device control code.

11. The control method of claim 10, further comprising: identifying the provider of the connected external device based on the image received from the connected external device.

12. The control method of claim 11, wherein the identifying the provider of the connected external device is performed based on at least one of a logo or a UI included in the received image.

13. The control method of claim 11, further comprising: generating the pre-stored device information in a cluster pattern according to the external device brand.

14. The control method of claim 10, wherein the pre-stored device information is assigned a recognition weight according to the external device brand.

15. The control method of claim 9, further comprising: selecting the external device based on area information using an IP address to which the electronic device is connected.

16. The control method of claim 9, wherein the device information includes at least one of HDMI Infoframe information, HDMI CEC information, IR code information, sound information, or resolution information.

17. A non-transitory computer-readable storage medium in which a computer program executable by a computer is stored, to cause the computer to execute an operation, the operation comprising:

connecting with an external device;

controlling a display to display an image based on an image signal received from the connected external device;

obtaining device information of the connected external device on a device characteristic of the connected external device received from the connected external device;

obtaining a plurality of first pieces of identification information based on an image-based recognition model, wherein the image-based recognition model learns the identification information identified from an identifier area in a displayed image provided by each of a plurality of external devices, the identifier area being located to correspond to a provider of each of the plurality of external devices;

obtaining a plurality of second pieces of identification information based on a device information-based recognition model, wherein the device information-based recognition model learns a relation between device characteristics of the plurality of external devices and identification information of providers of the plurality of external devices;

identifying one identification information commonly included in the plurality of first pieces of identification information and the plurality of second pieces of identification information, as identification information of a provider of the connected external device; and performing an operation based on the identification information of the provider of the connected external device.

18. The non-transitory computer-readable storage medium of claim 17, wherein the device information-based recognition model is learned to map a plurality of pieces of pre-stored device information associated with the plurality of external devices to an electronic device brand and/or an external device control code.

19. An electronic device, comprising:
a display;
an interface circuitry configured to be connected to an external device; and
a processor configured to:
control the display to display an image based on an image signal received from the external device which is connected through the interface circuitry,
obtain device information of the connected external device on a device characteristic of the connected external device received from the connected external device,
obtain identification information of a provider of the connected external device based on a device information-based recognition model, wherein the device information-based recognition model learns a relation between device characteristics of a plurality of external devices and identification information of providers of the plurality of external devices,
wherein, in response to a plurality of pieces of identification information being obtained based on the device information-based recognition model, the processor is configured to obtain one among the plurality of pieces of identification information based on an image-based recognition model, wherein the image-based recognition model learns the identification information identified from an identifier area in a displayed image provided by each of a plurality of external devices, the identifier area being located to correspond to a provider of each of the plurality of external devices, and
perform an operation based on the identification information of the provider of the connected external device.

* * * * *